US008690689B1

(12) United States Patent
Narvaez et al.

(10) Patent No.: US 8,690,689 B1
(45) Date of Patent: Apr. 8, 2014

(54) DRIVESHAFT COUPLING

(75) Inventors: Pedro J. Narvaez, Longmont, CO (US); Paul J. Cornay, Longmont, CO (US); Richard J. Cason, Loveland, CO (US)

(73) Assignee: Cornay Company LLC, Longmont, CO (US)

( * ) Notice: Subject to any disclaimer, the term of this patent is extended or adjusted under 35 U.S.C. 154(b) by 0 days.

(21) Appl. No.: 13/275,724

(22) Filed: Oct. 18, 2011

Related U.S. Application Data

(60) Provisional application No. 61/394,106, filed on Oct. 18, 2010.

(51) Int. Cl.
*F16D 3/32* (2006.01)

(52) U.S. Cl.
USPC ............................ 464/117; 403/338; 464/905

(58) Field of Classification Search
USPC ......... 464/117, 118, 125, 126, 136, 182, 901, 464/905; 403/337, 338
See application file for complete search history.

(56) References Cited

U.S. PATENT DOCUMENTS

| 958,927 | A | | 5/1910 | Kelly |
| 1,621,217 | A | * | 3/1927 | Peters ...................... 464/125 X |
| 2,984,997 | A | * | 5/1961 | Wight ........................... 464/905 |
| 3,623,573 | A | | 11/1971 | Csanady, Jr. et al. |
| 4,053,248 | A | | 10/1977 | Schultenkamper et al. |
| 4,191,487 | A | | 3/1980 | Schultenkamper |
| 5,431,507 | A | | 7/1995 | Smilanick |
| 5,586,652 | A | | 12/1996 | Smilanick |
| 5,746,659 | A | | 5/1998 | Lindenthal |
| 6,540,617 | B2 | | 4/2003 | Lindenthal et al. |
| 6,773,353 | B2 | | 8/2004 | Cornay et al. |

\* cited by examiner

*Primary Examiner* — Gregory Binda
(74) *Attorney, Agent, or Firm* — Garvey, Smith, Nehrbass & North, L.L.C.; Seth M. Nehrbass; Julia M. FitzPatrick

(57) ABSTRACT

A connection apparatus includes a first flange member having a threaded portion; a second flange member having a threaded portion; a central annular connecting flange positioned in between the first and second flanges; a pair of cross trunnion assemblies being next to and on opposing sides of the annular connecting flange; a pair of threaded collars connecting each trunnion assembly to the connecting flange and a flange; a plurality of key and slot connections that provide an interlocking interface between each flange and each trunnion assembly; and bolted connections the secure each trunnion assembly to the central annular connecting flange.

5 Claims, 18 Drawing Sheets

SECTION B-B

SECTION A-A

SECTION A-A

SECTION B-B

SECTION A-A

SECTION B-B

DRIVESHAFT COUPLING

CROSS-REFERENCE TO RELATED APPLICATIONS

This is a non provisional patent application of U.S. Provisional Patent Application Ser. No. 61/394,106, filed Oct. 18, 2010.

Priority of U.S. Provisional Patent Application Ser. No. 61/394,106, filed Oct. 18, 2010, hereby incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates primarily to methods for quickly disconnecting driveshafts and couplings from driving and driven flanges with a threaded collar. More particularly, the present invention relates primarily to a method of quickly connecting and disconnecting a Cross-Tooth Propeller Shaft Flange, type T as in International Standard ISO 12667 with a threaded collar. A second embodiment of the present invention relates primarily to a method of quickly connecting and disconnecting a wing bearing style universal joint to a flange with a threaded collar. A third embodiment of the present invention relates to a short couple double wing bearing style universal with a quick disconnect threaded collar on each end.

2. General Background of the Invention

Typical means for attaching a coupling or universal joint to a driving or driven flange includes a plurality of bolts that fixedly attach the coupling or universal joint flange face to the face of the driving and driven flanges. Wing bearing and half-round universal joint styles employ a plurality of bolts to secure cross trunnion and bearing assemblies to driving yoke and flange components. In many driveline applications, 360° access is not available to properly remove and install all flange bolts. The present invention provides an improved method of attaching a coupling or universal joint to a driving or driven flange by providing a single locking collar that can fixedly secure a coupling or universal joint component to a driving or driven flange. By providing a collar with a shoulder that mates with a corresponding shoulder on the coupling or universal joint and a threaded section within the collar that mates with a corresponding threaded section on the of the flange, then the coupling or universal joint can then be attached to the flange in a secure manner.

This method of attaching a coupling or universal joint to a flange is advantageous over other means because proper torque can be applied to the collar from any position where access is available. Other attachment means can have bolts that can only be accessed from the opposite side of the shaft making proper installation difficult or impossible in confined spaces.

The components of the present invention preferably employ a grooved flange face having a cross-tooth propeller shaft flange, type T as in International Standard ISO 12667, which mates with corresponding teeth on the coupling or universal joint. A collar that has a shoulder and a threaded section whereby the collar can be placed over the coupling or universal joint flange and threaded onto the mating driving or driven flange therein securing the coupling or universal joint to the flange.

U.S. Pat. Nos. 6,540,617 B2 5,746,659; 5,586,652; 5,431, 507; 4,191,487; 4,053,248; 3,623,573 and 958,927 are incorporated herein by reference, and disclose various connecting means using toothed components for connecting driveshafts and tubing.

BRIEF SUMMARY OF THE INVENTION

In a preferred embodiment of the present invention, a collar is used to attach a CORNAY® (preferably) or other universal or constant velocity joint flange to a driving or driven flange wherein each flange face has a series of cross toothed grooves that mate with corresponding toothed grooves on the mating flange. This embodiment of the present invention is advantageous over bolting style flanges because only a few turns of the collar will securely attach one flange to the other making the processing of connecting and disconnecting a driveshaft quick and easy. Preferably, there is a locking system on the collar which prevents inadvertent unscrewing of the connection.

In a second embodiment of the present invention a collar is used to attach a wing style bearing of a universal joint to a flange in a driveshaft. This second embodiment of the present invention is advantageous over bolted style wing bearings in applications where access to wing bearing bolts is limited due to surrounding components. This second embodiment of the present invention is also advantageous over bolting style wing bearings because only a few turns of the collar will securely attach the wing bearings to the mating flange, making the processing of connecting and disconnecting a driveshaft employing wing bearings quick and easy. Preferably, there is a locking system on the collar which prevents inadvertent unscrewing of the connection.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 1:
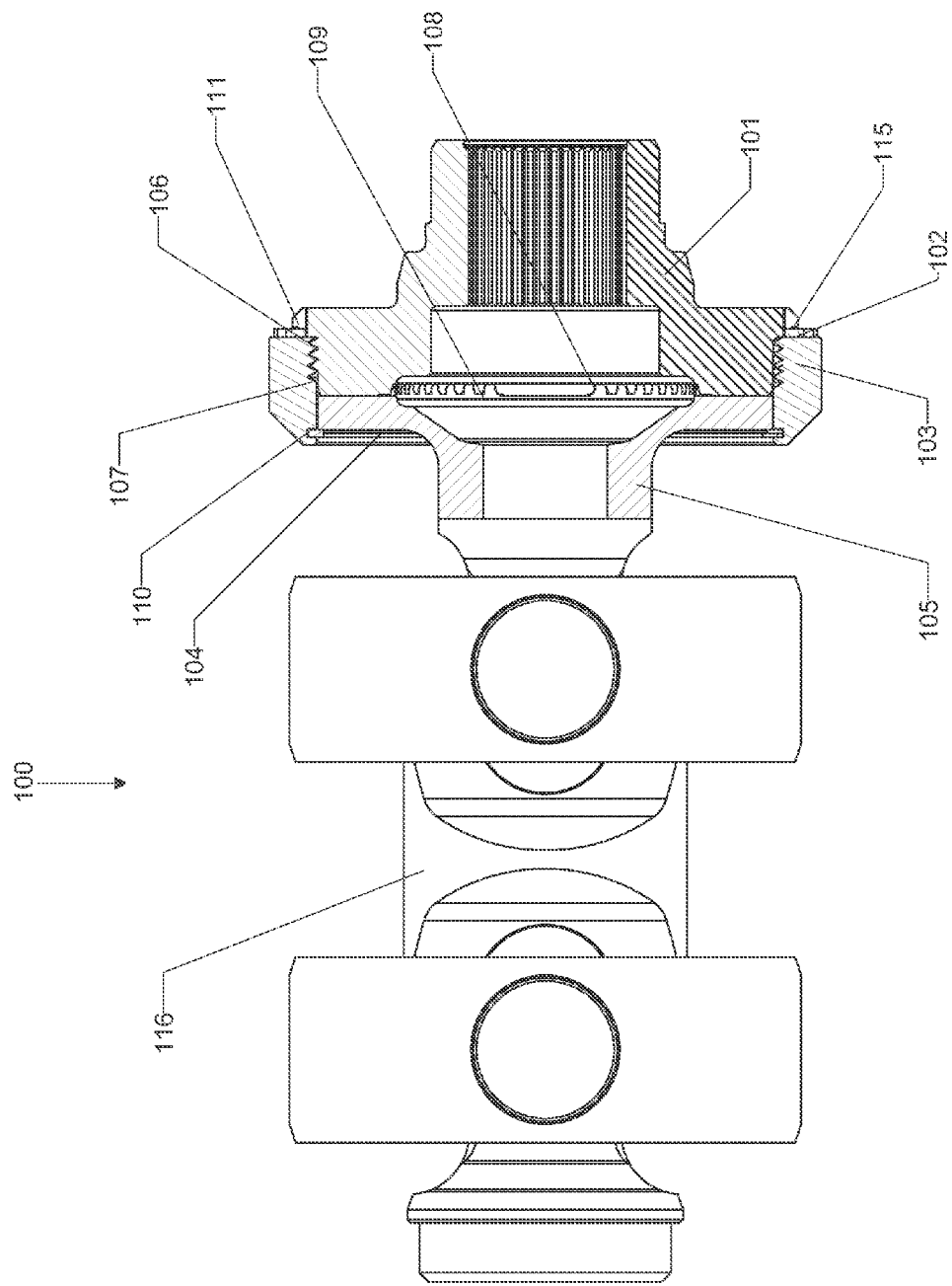
FIG. 1 is a partially sectional view through section A-A of FIG. 6 of Driveshaft Coupling 100, the first embodiment of the apparatus of the present invention.

Driveshaft Coupling 100 includes cross toothed driving flange 101, collar 103, universal joint or coupling cross toothed flange yoke 105, retaining and locking ring 102 and retaining ring 104.

Although a Cornay® constant velocity joint 10 (of the type shown in Cornay Company U.S. Pat. No. 6,773,353, and commercially available from Cornay Company as model no. CVX-30) is shown in this example of the preferred embodiment, other types of Cardan, Hooks, Double Cardan, Rzeppa, Tripot and various other types of universal joints, constant velocity joints, and flexible and rigid driveshaft couplings can also employ this attachment means.

Figure 2:
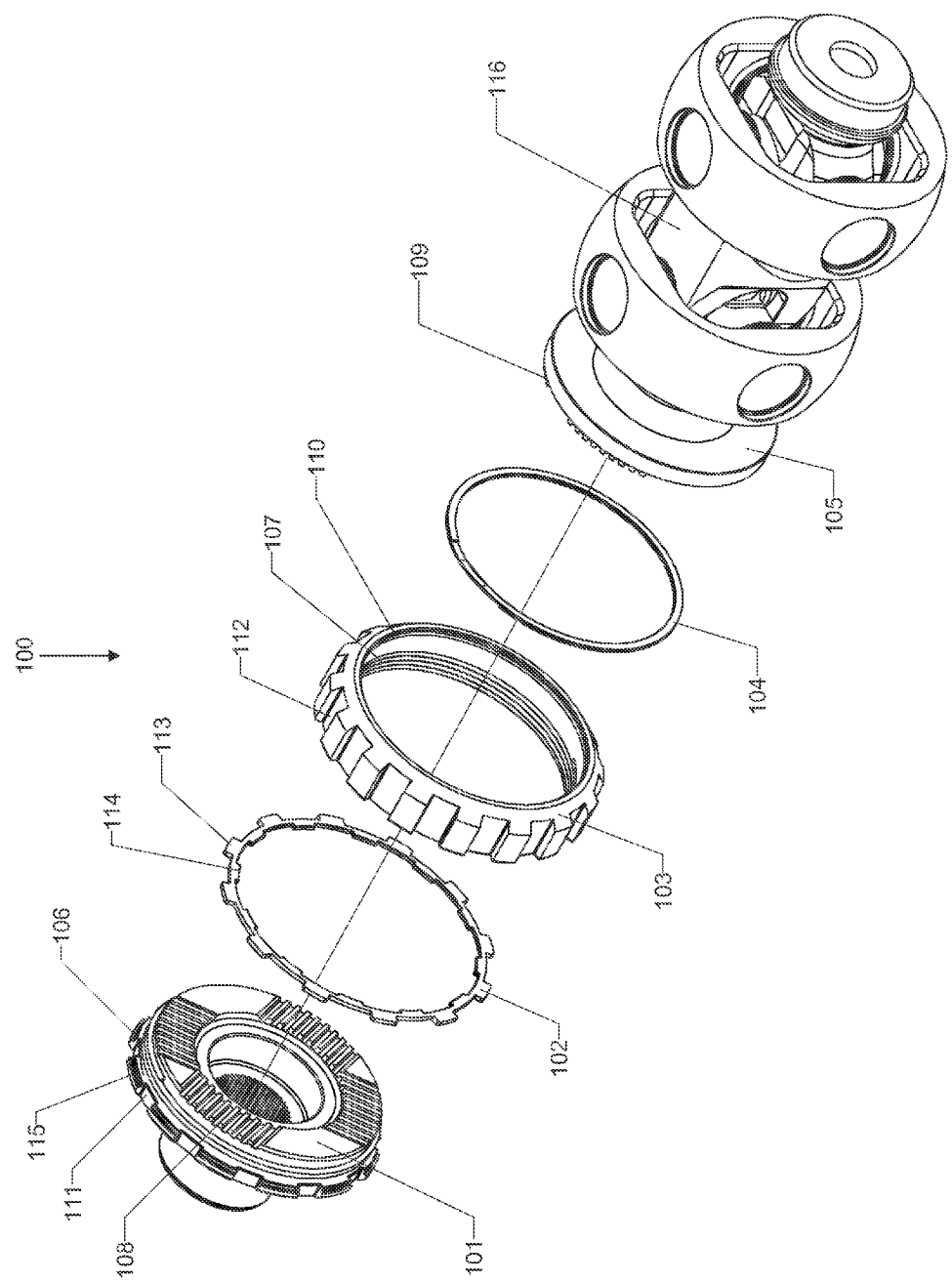
FIG. 2 is an isometric perspective view exploded view of Driveshaft Coupling 100, the first embodiment of the apparatus of the present invention with a view of the driving/driven flange face.
Figure 3:
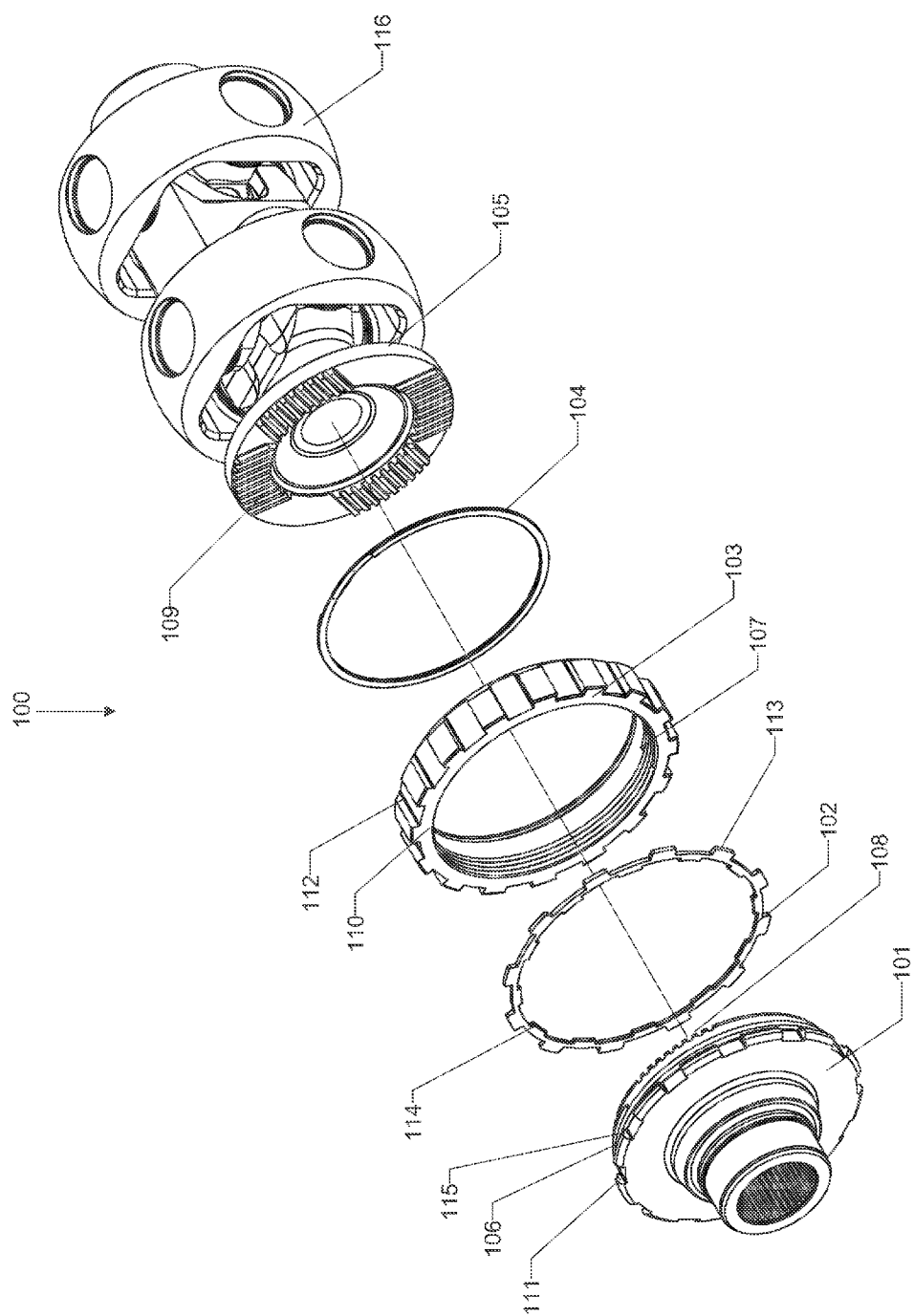
FIG. 3 is an isometric perspective exploded view of Driveshaft Coupling 100, the first embodiment of the apparatus of the present invention with a view of the Cornay® universal or constant velocity joint flange face.
Figure 4:
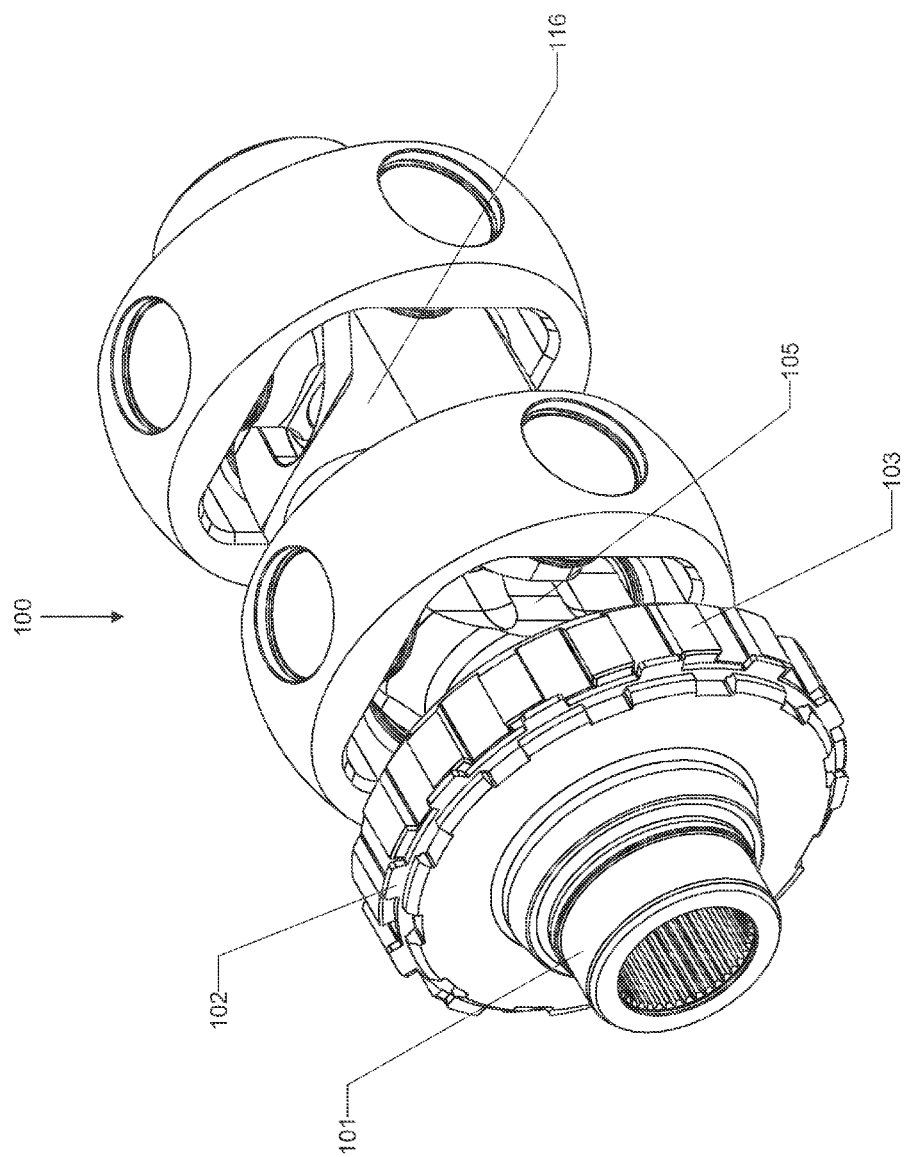
FIG. 4 is an isometric perspective view of the assembled components of Driveshaft Coupling 100, the first embodiment of the apparatus of the present invention with a view from the driving/driven flange side.
Figure 5:
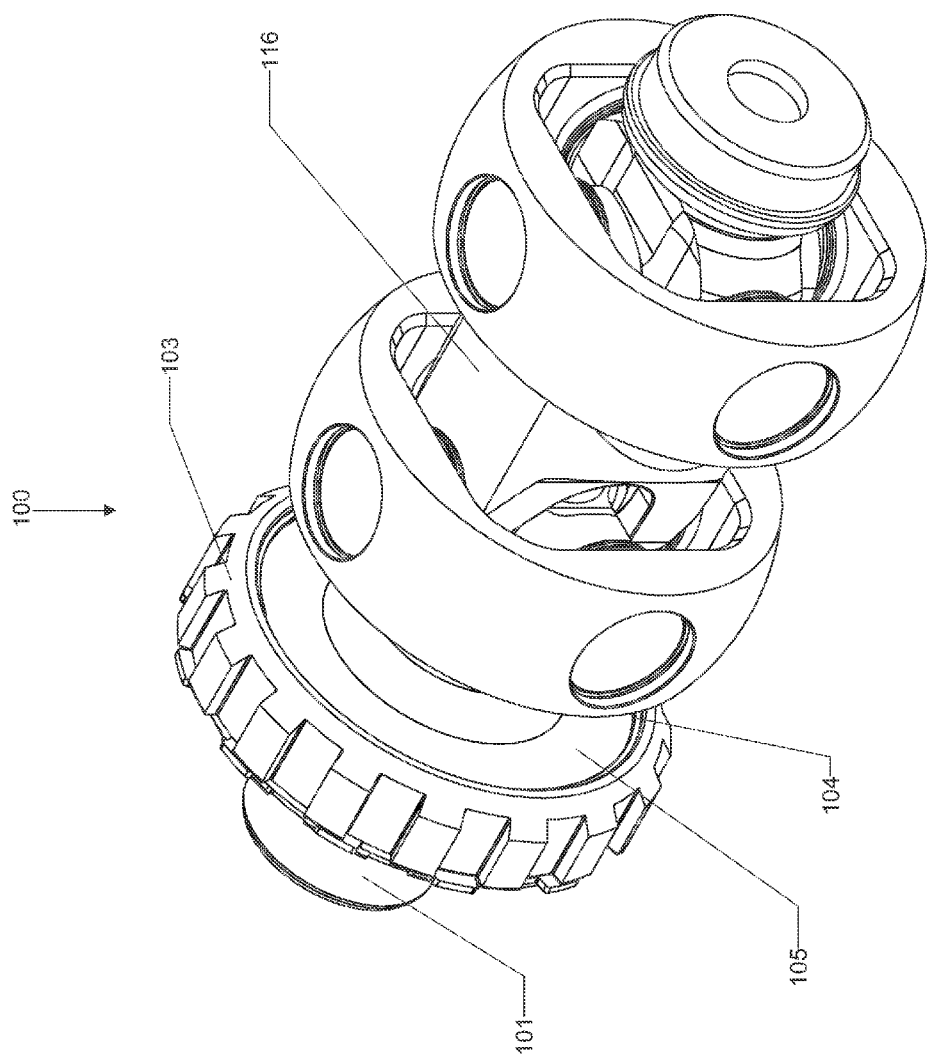
FIG. 5 is an isometric perspective view of the assembled components of Driveshaft Coupling 100, the first embodiment of the apparatus of the present invention with a view from the Cornay® universal or constant velocity joint side.
Figure 6:
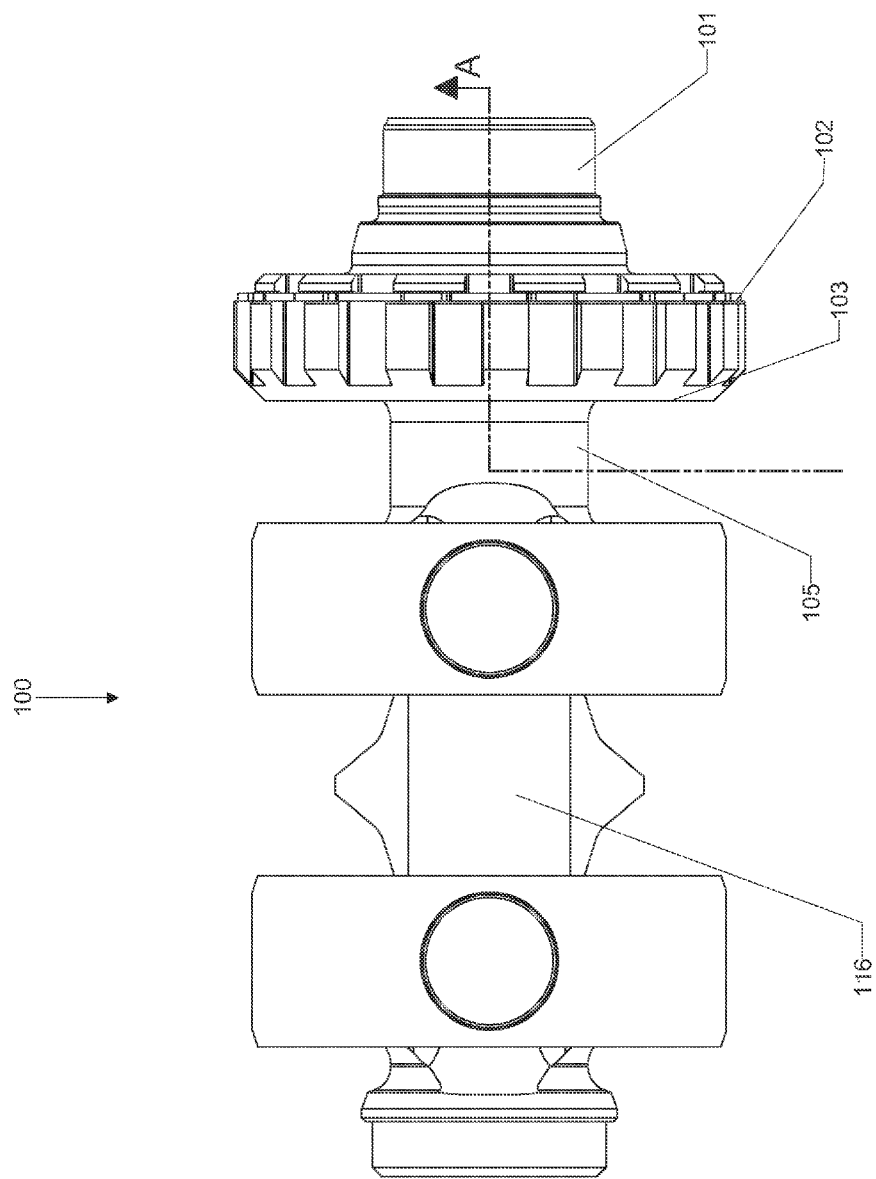
FIG. 6 is a partially sectional view of Driveshaft Coupling 100, the first embodiment of the apparatus of the present invention showing section A-A.

Driveshaft Coupling 100, shown in FIGS. 1-6, can be assembled by the following method:

First: Assemble collar 103 onto cross-toothed coupling flange 105 of coupling. Retaining ring 104 is installed over cross-toothed coupling flange 105 by spreading open the coils of the retaining ring 104 and feeding the retaining ring 104 over and behind the face of flange 105 of constant velocity joint or coupling 116 and feeding the coils around until the retaining ring 104 is on the side of the face of flange 105 opposite to cross teeth 109. Collar 103 is then inserted over cross-toothed coupling flange 105 so that retaining ring 104 can be installed into groove 110 of collar 103.

Second: Assemble retaining and locking ring 102 onto cross-toothed threaded flange 101. Retaining and locking ring 102 is installed onto cross-toothed threaded flange 101 such that tabs 114 engage with grooves 111 of cross-toothed threaded flange 101 and retaining and locking ring 102 abuts against shoulder 115 of cross-toothed threaded flange 101.

Third: Cross-toothed coupling flange 105 is attached to cross-toothed threaded flange 101. Flanges 101 and 105 are brought together such that the teeth 109 of cross-toothed coupling flange 105 mates with the teeth 108 of cross-toothed threaded flange 101. Collar 103 is screwed onto cross-toothed threaded flange 101 by the engagement of threads 107 of collar 103 with threads 106 of flange 101.

Fourth: After sufficient torque has been applied to collar 103 to remove all free play then one or more of tabs 113 of retaining and locking ring 102 are folded into grooves 112 of collar 103 thereby preventing collar 103 from unscrewing.

Figure 7:
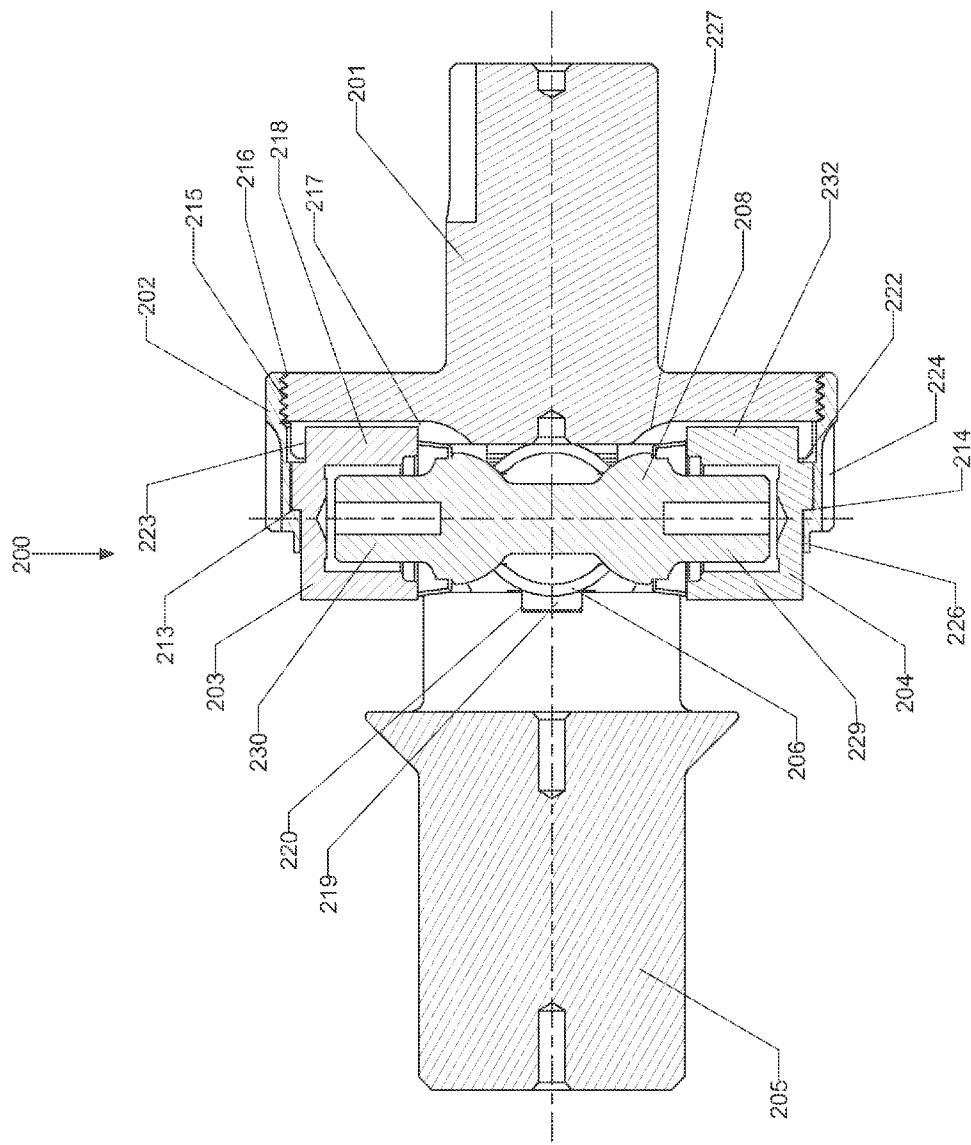
FIG. 7 is a sectional view of Driveshaft Coupling 200, the second embodiment of the apparatus of the present invention through section A-A of FIG. 10.
Figure 8:
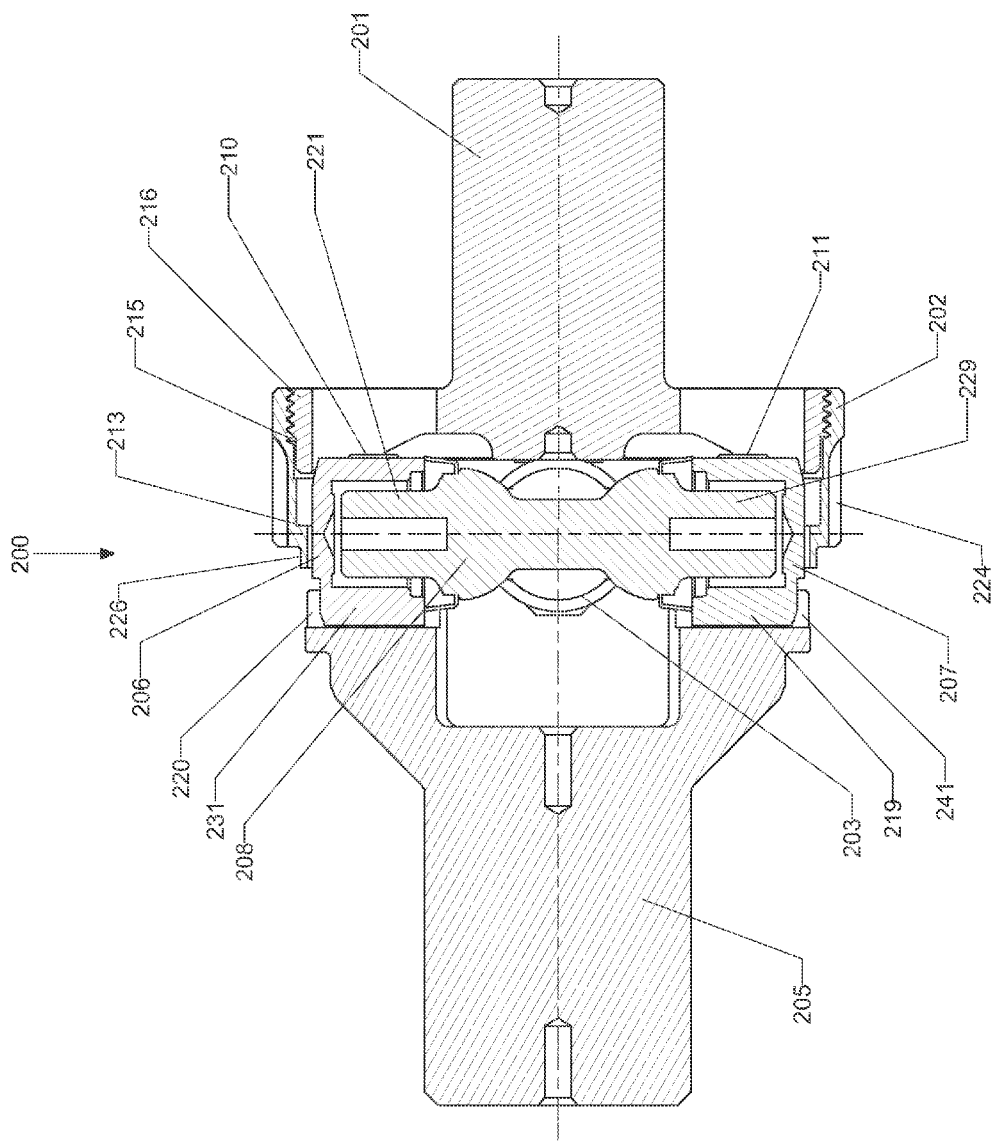
FIG. 8 is a sectional view of Driveshaft Coupling 200, the second embodiment of the apparatus of the present invention showing section B-B of FIG. 11.
Figure 9:
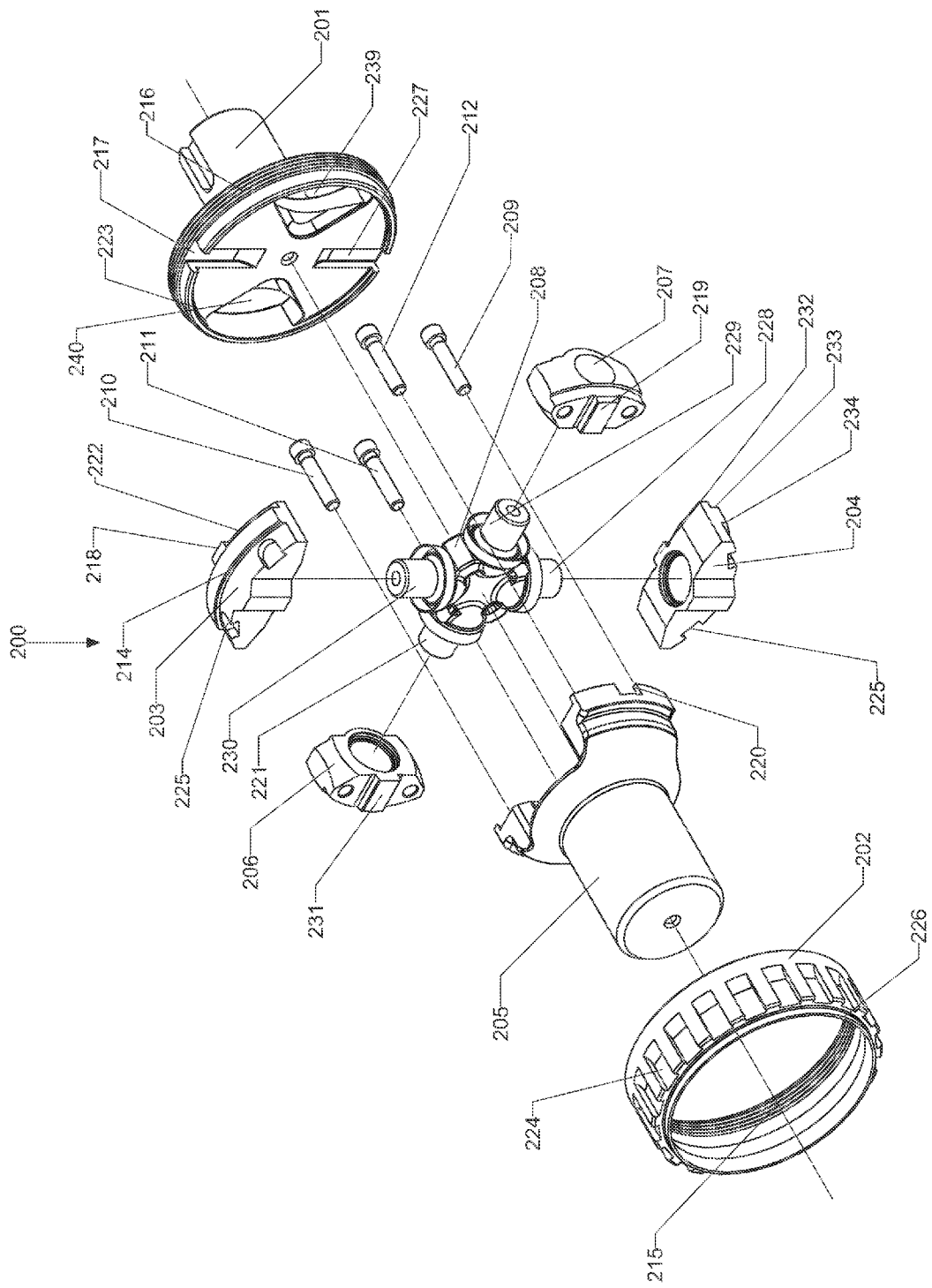
FIG. 9 is an isometric perspective exploded view of Driveshaft Coupling 200, the second embodiment of the apparatus of the present invention with a view from the threaded sleeve side.
Figure 10:
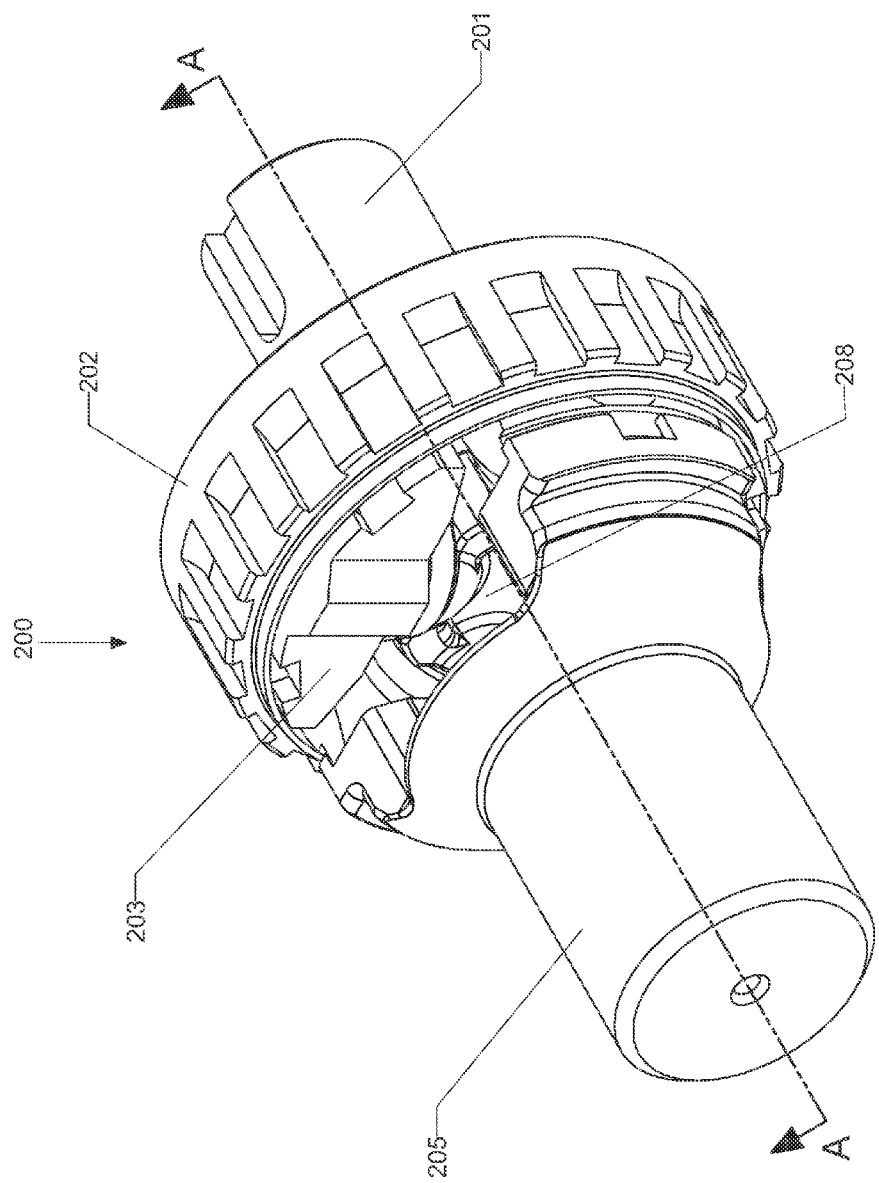
FIG. 10 is an isometric perspective view of the assembled components of Driveshaft Coupling 200, the second embodiment of the apparatus of the present invention with a view from the wing bearing yoke side showing section A-A.
Figure 11:
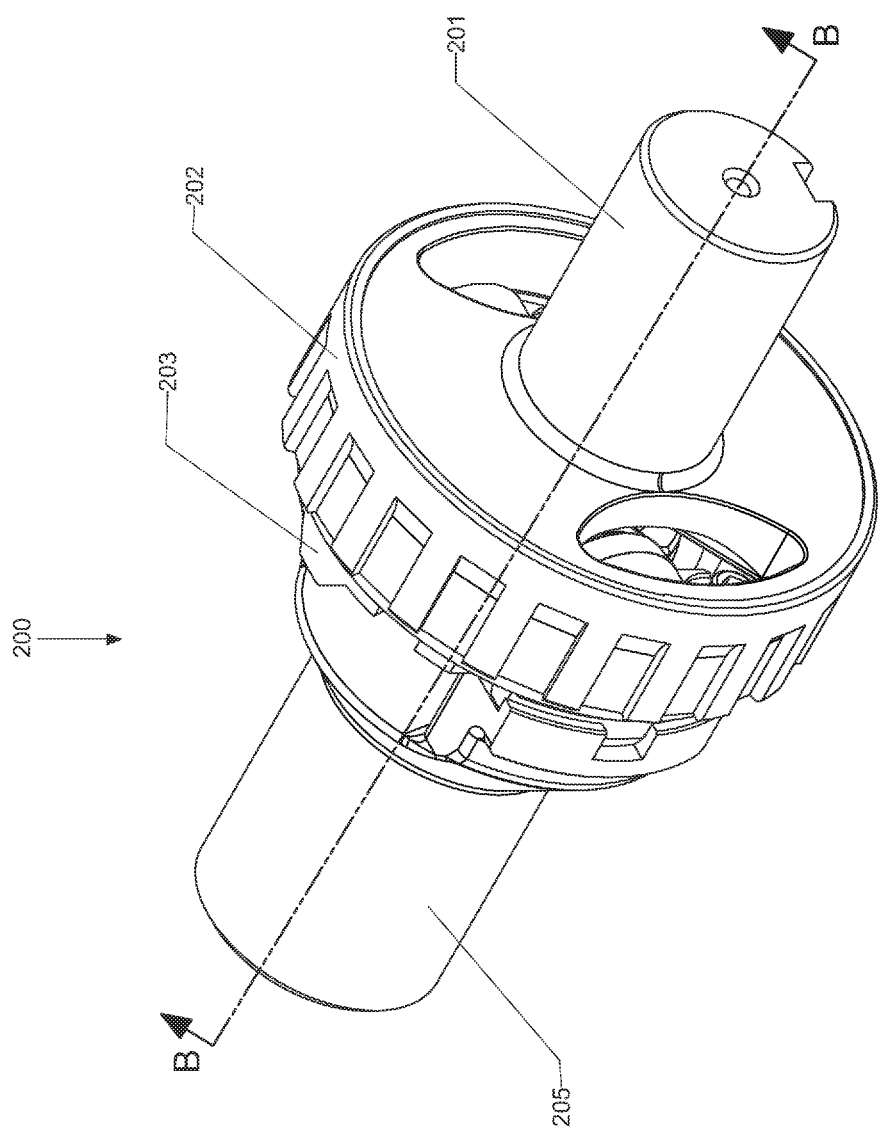
FIG. 11 is an isometric perspective view of the assembled components of Driveshaft Coupling 200, the second embodiment of the apparatus of the present invention with a view from the threaded flange side showing section B-B.
Figure 12:
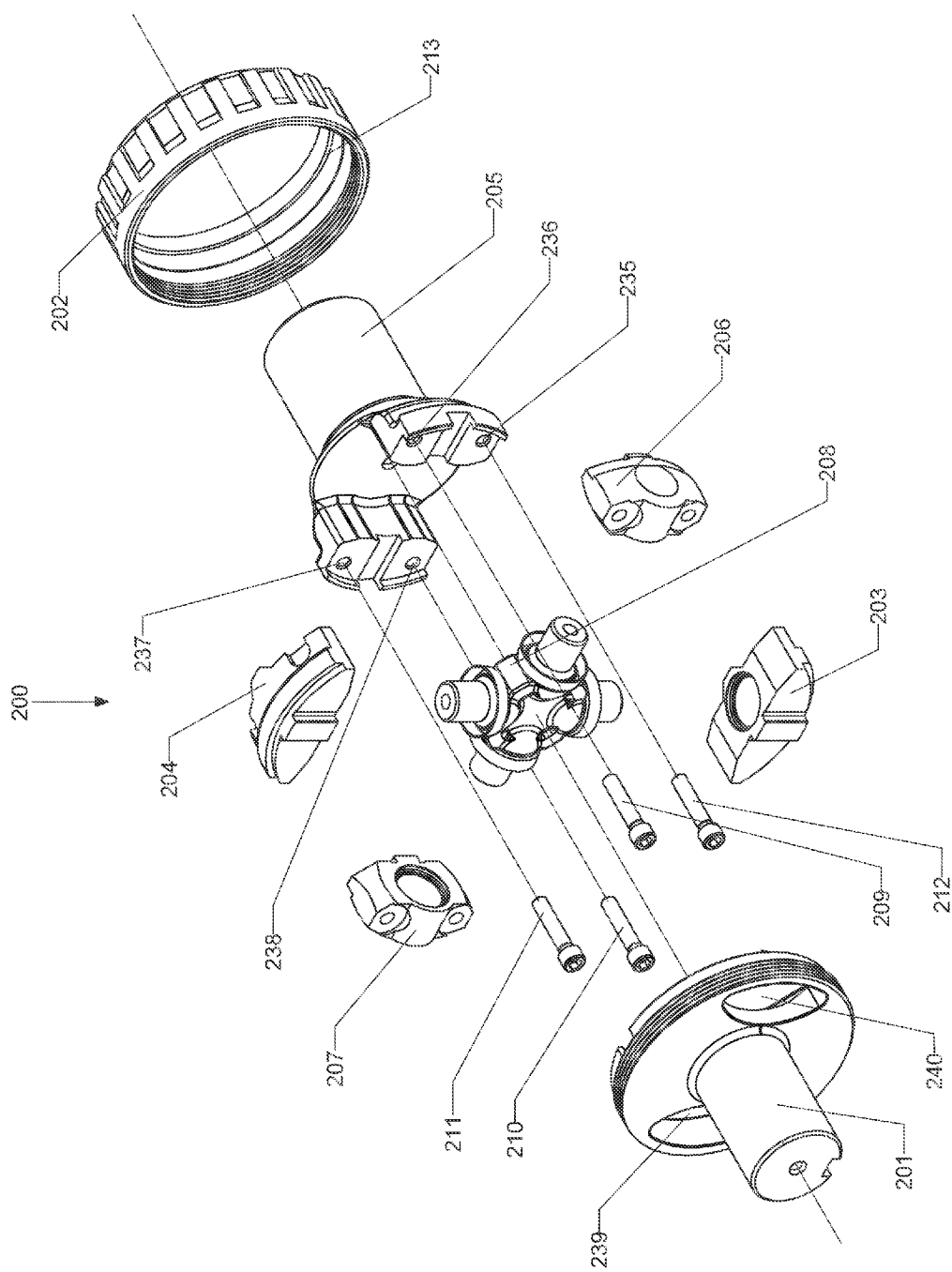
FIG. 12 is a an isometric perspective exploded view of Driveshaft Coupling 200, the second embodiment of the apparatus of the present invention with a view from the threaded collar side.

Driveshaft Coupling 200, shown in FIGS. 7-12, includes wing bearing threaded flange 201, wing bearing yoke 205, collar 202, cross-trunnion 208 and shouldered wing bearings 203, 204, 206 and 207.

Driveshaft Coupling 200 can be assembled by the following method:

First: Install collar 202 over wing bearing yoke 205.

Second: Install wing bearings 206 and 207 onto trunnions 221 and 229 respectively.

Third: Install wing bearing 203 and 204 onto trunnions 230 and 228 respectively.

Fourth: Install wing bearing and cross trunnion assembly onto wing bearing yoke 205 such that keys 219 and 231 engage with notches 220 and 241.

Fifth: Screw in bolts 209-212 into holes 235-238 of wing bearing yoke 205 until the proper torque has been reached.

Sixth: Install wing bearing, shouldered wing bearing, cross trunnion and wing bearing yoke and collar assembly onto wing bearing threaded flange 201 such that keys 218 and 232 engage with notches 217 and 227, and shoulders 222 and 233 engage with shoulder 223 of wing bearing threaded flange 201.

Seventh: Screw collar 202 onto wing bearing threaded flange 201 by engaging a commercially available spanner wrench (not shown) or similar tool into notches 224 such that threads 215 of collar 202 engage with threads 216 of flange 201 and shoulder 213 (see FIG. 12) of collar 202 engages with shoulders 214 and 234 (see FIG. 9) of wing bearings 203 and 204 respectively.

Eighth: Fold one or more of lips 226 of collar 202 into one or more of notches 225 of shouldered wing bearings 203 and 204 [need to add ref numeral 225 to 204] to prevent unscrewing.

Driveshaft Coupling 200 can be partially assembled or disassembled by the following: Wing bearing yoke 205 of driveshaft coupling 200 may also be removed from, wing bearing threaded flange, collar, cross-trunnion and wing bearing assembly by removing bolts 209-212 through windows 239 and 240.

Figure 13:
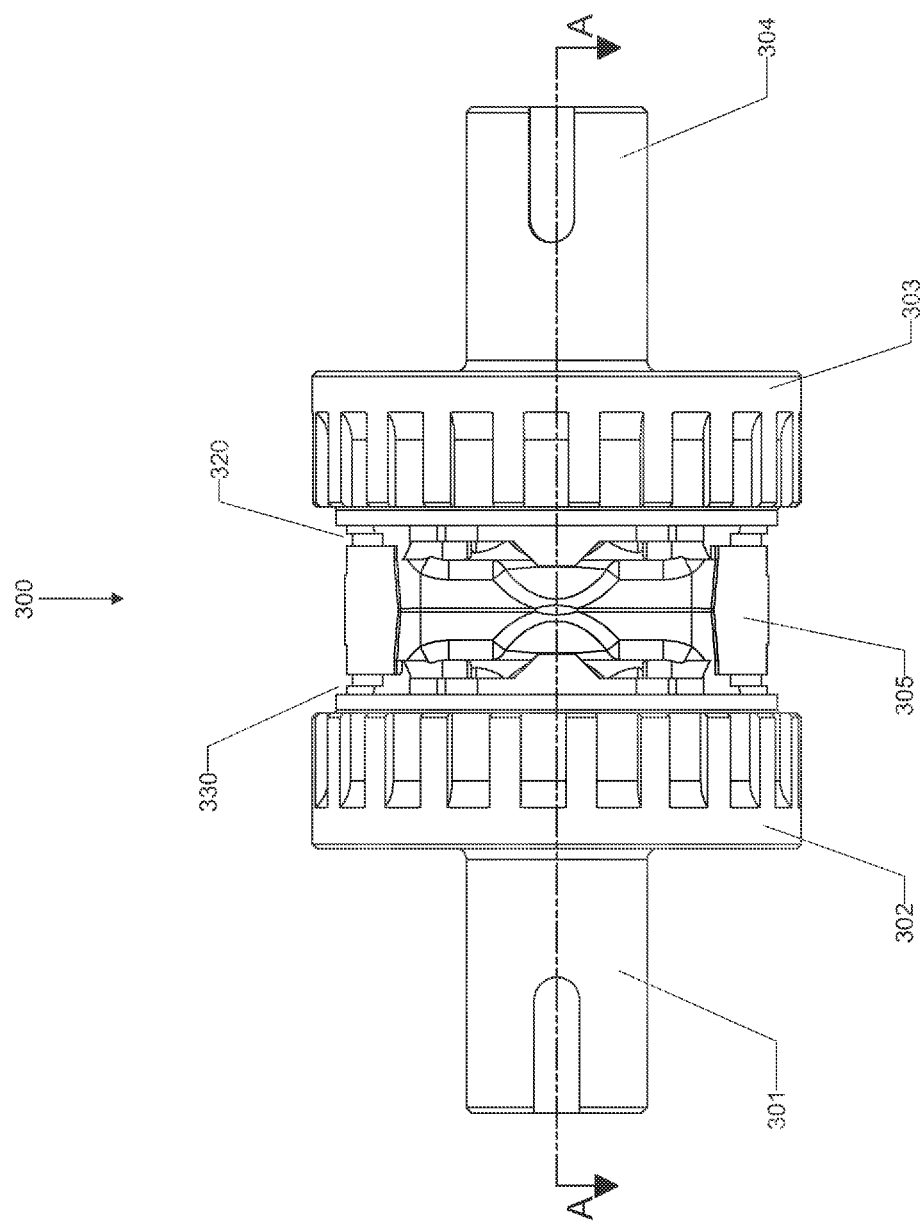
FIG. 13 is an isometric perspective view of the assembled components of Driveshaft Coupling 300, the third embodiment of the apparatus of the present invention showing section A-A.
Figure 14:
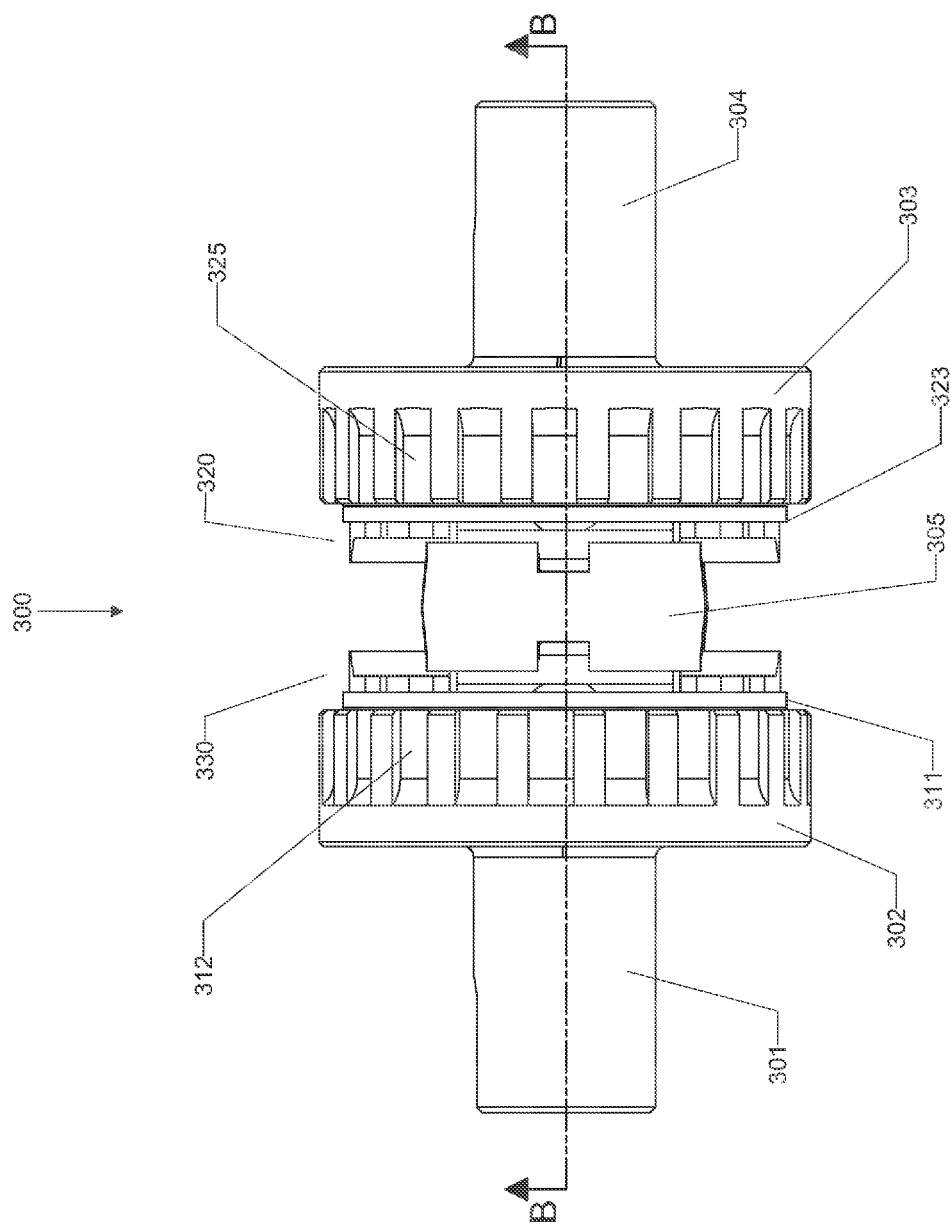
FIG. 14 is an isometric perspective view of the assembled components of Driveshaft Coupling 300, the third embodiment of the apparatus of the present invention showing section B-B.
Figure 15:
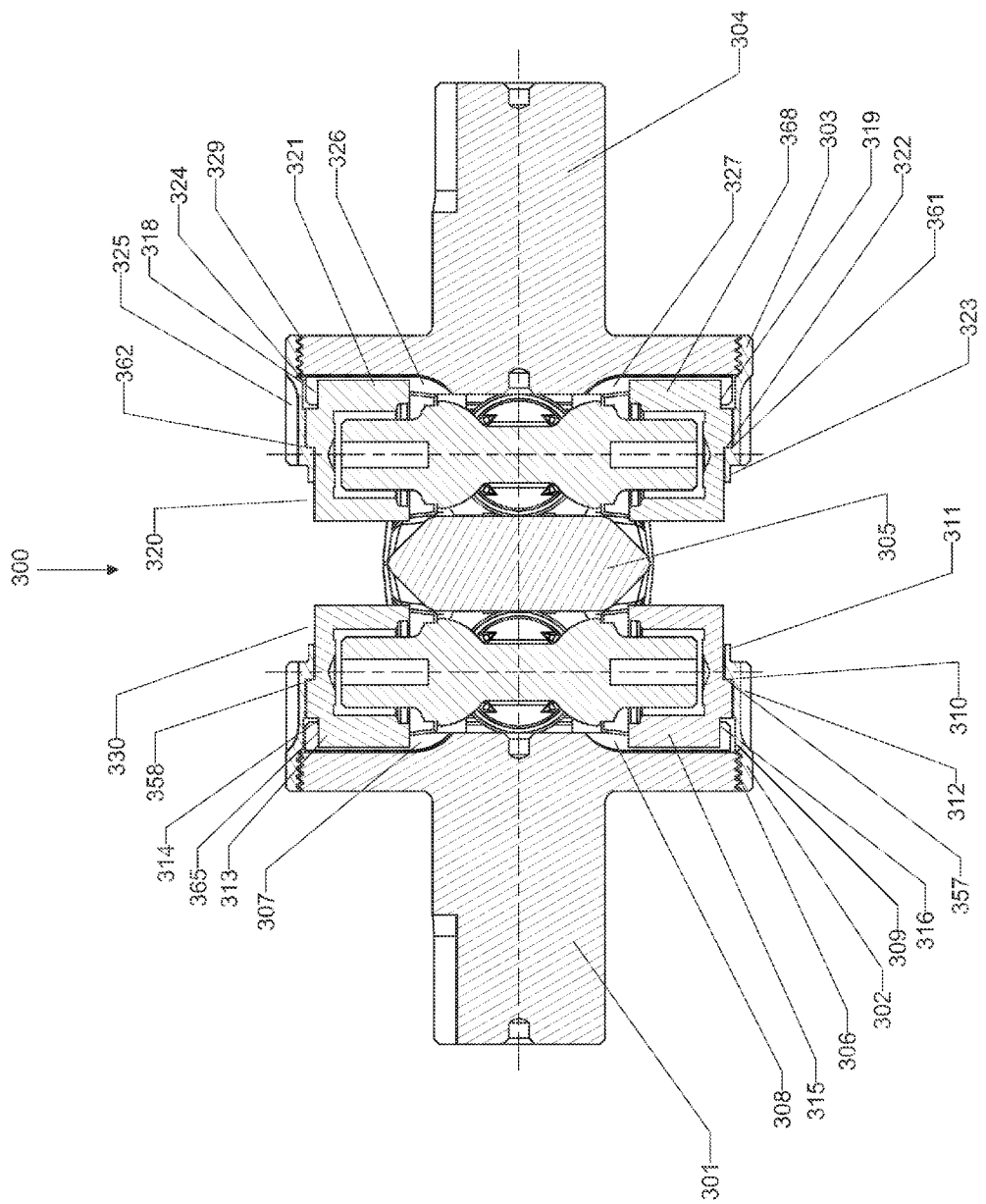
FIG. 15 is a sectional view of Driveshaft Coupling 300, the third embodiment of the apparatus of the present invention through section A-A of FIG. 13.
Figure 16:
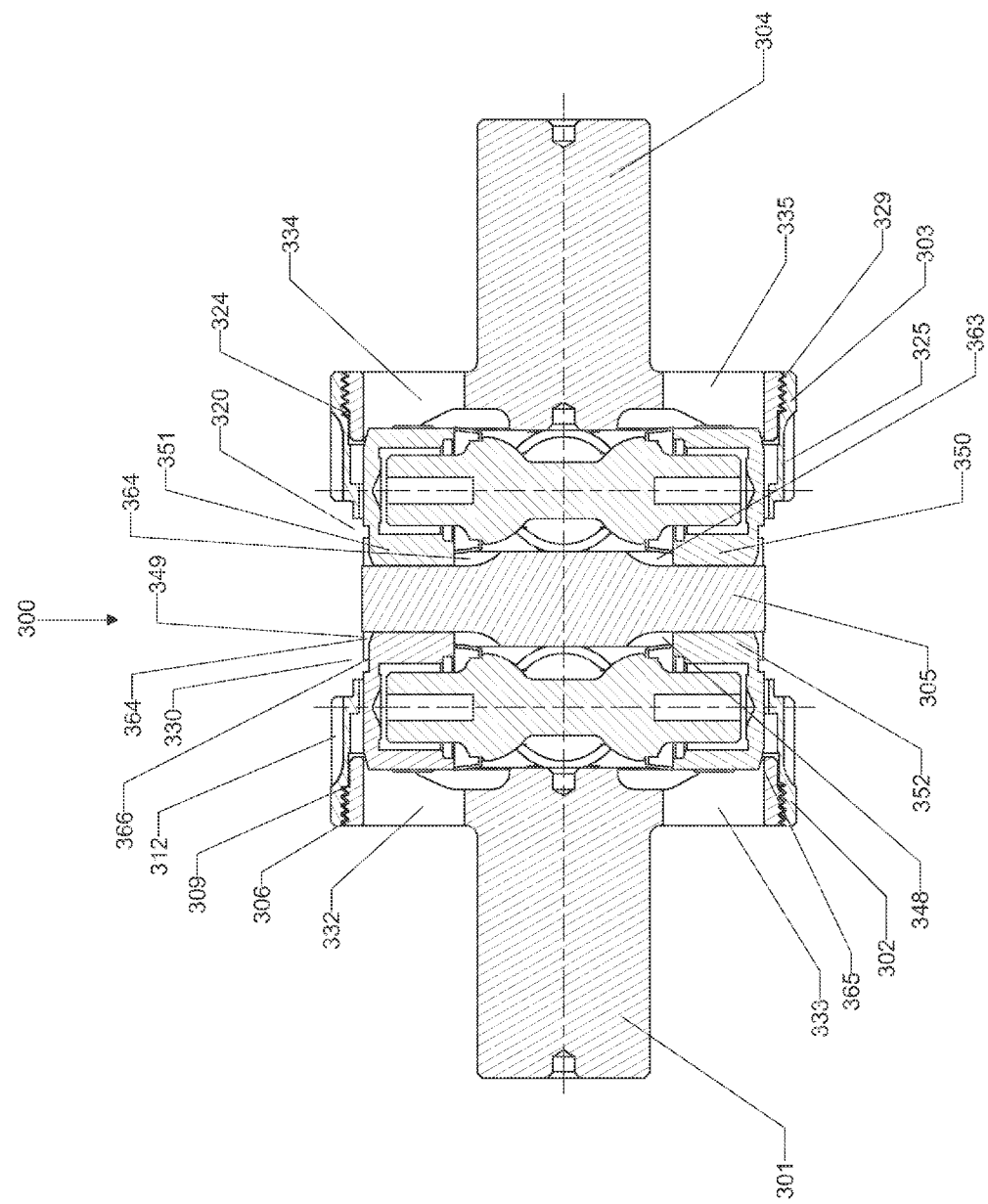
FIG. 16 is a sectional view of Driveshaft Coupling 300, the third embodiment of the apparatus of the present invention through section B-B of FIG. 14.
Figure 17:
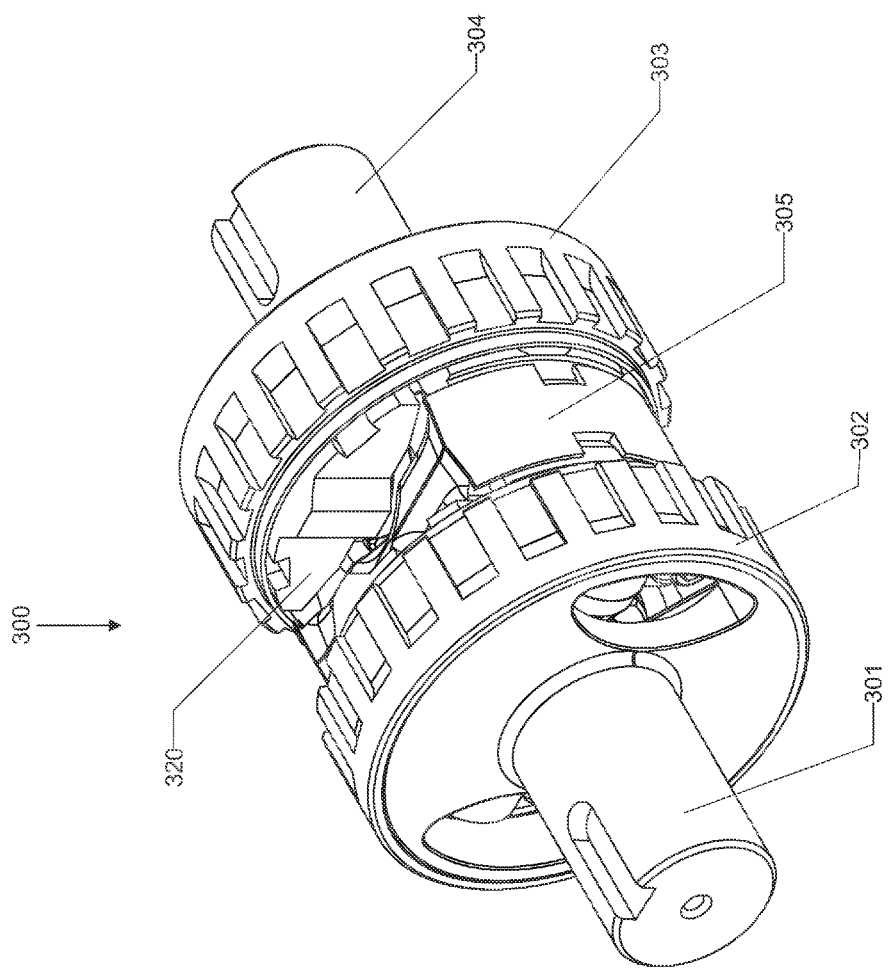
FIG. 17 is an isometric perspective view of the assembled components of Driveshaft Coupling 300, the third embodiment of the apparatus of the present invention.
Figure 18:
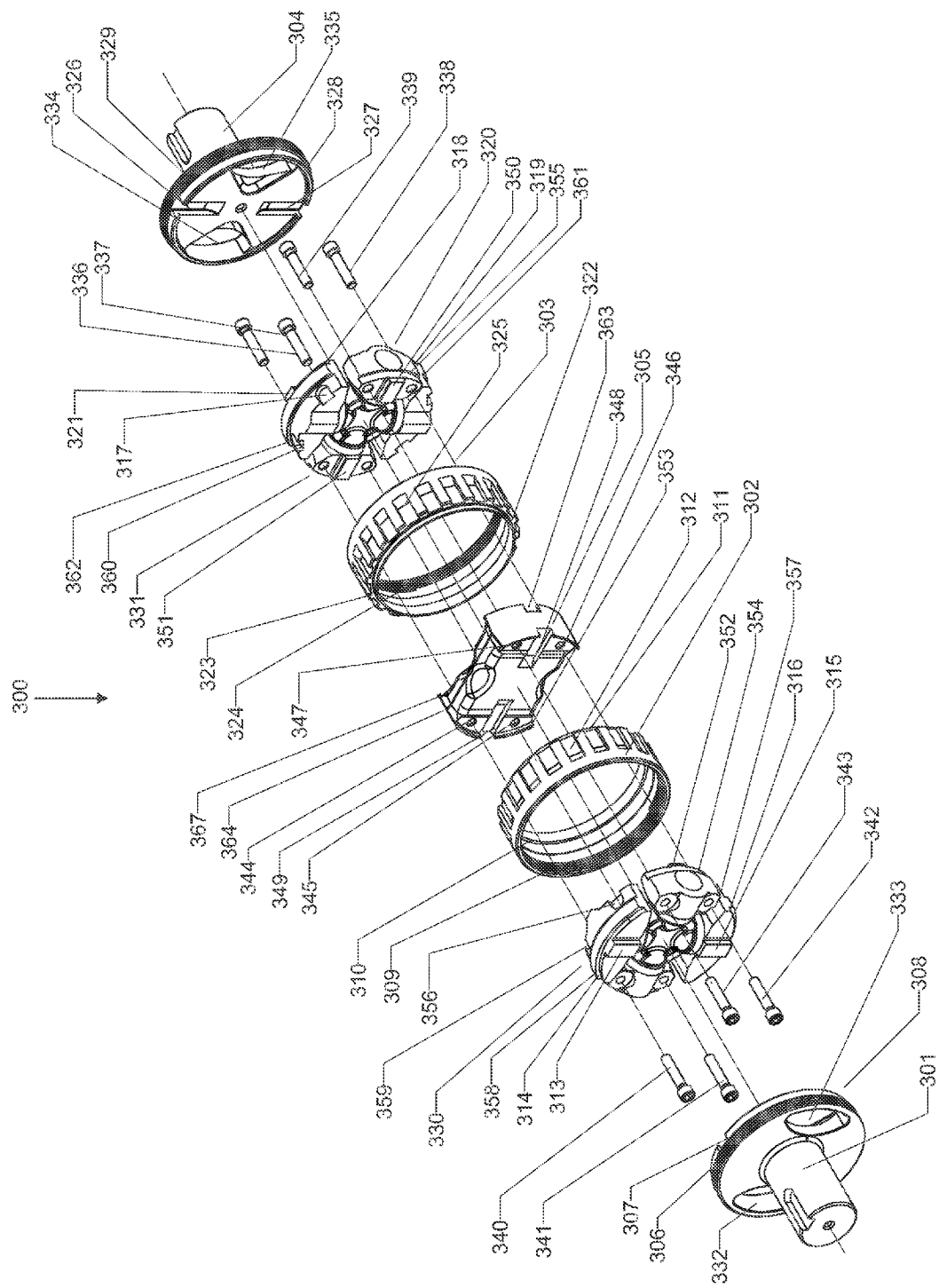
FIG. 18 is a an isometric perspective exploded view of Driveshaft Coupling 300, the third embodiment of the apparatus of the present invention.

Driveshaft Coupling 300, shown in FIGS. 13-18, includes wing bearing threaded flanges 301 and 304, collars 302 and 303, cross trunnion and wing bearing assemblies 320 and 330, wing bearing connecting flange 305 and bolts 336-339 and bolts 340-343.

Driveshaft Coupling 300 can be assembled by the following method (see FIG. 18):

First: Place collars 302 and 303 over wing bearing connecting flange 305 such that shoulders 310 and 322 are near the center.

Second: Install wing bearing and cross trunnion assembly 330 onto wing bearing connecting flange 305 such that keys 352, 358, engage with notches 348, 349 respectively, and shoulders 354 and 366 engage with shoulder 353 of wing bearing connecting flange 305.

Third: Install wing bearing and cross trunnion assembly 320 onto wing bearing connecting flange 305 such that keys 350, 351 engage with notches 363, 364 respectively, and shoulders 355 and 331 engage with shoulder 367 of wing bearing connecting flange 305.

Third: Install bolts 340-343 into holes of wing bearing and cross trunnion assembly 330, and screw into holes 344-347 of connecting flange 305 respectively and tighten.

Fourth: Install bolts 336-339 into holes of wing bearing and cross-trunnion assembly 320 and screw into holes 344-347 of connecting flange 305 respectively and tighten.

Fifth: Install wing bearing, cross-trunnion and wing bearing connecting flange assembly onto wing bearing threaded flange 301 such that keys 313, 315, engage with notches 307, 308, respectively, and shoulders 314 and 316 engage with shoulder 365 of wing bearing threaded flange 301.

Sixth: Screw collar 302 onto wing bearing threaded flange 301 by engaging a commercially available spanner wrench (not shown) or other tool into notches 312 of collar 302 such that threads 309 of collar 302 engage with threads 306 of wing bearing threaded flange 301 and shoulder 310 of collar 302 engages with shoulders 357 and 358 of wing bearing and cross trunnion and wing bearing connecting flange assembly and tighten.

Seventh: Fold lip 311 into notch 356 and 359 of cross trunnion and wing bearing assembly 330 to prevent collar 302 from unscrewing.

Eighth: Install wing bearing, cross trunnion, wing bearing connecting flange and wing bearing threaded flange assembly onto wing bearing threaded flange 304 such that keys 321, 368, engage with notches 326, 327, respectively and shoulders 318 and 319 engage with shoulder 328 of wing bearing connecting flange 304.

Ninth: Screw collar 303 onto wing bearing threaded flange 304 by engaging a commercially available spanner wrench (not shown) or other tool into notches 325 of collar 303 such that threads 324 of collar 303 engage with threads 329 of wing bearing threaded flange 304 and shoulder 322 of collar 303 engages with shoulders 361 and 362 of wing bearing and cross trunnion and wing bearing connecting flange assembly and tighten.

Tenth: Fold lip 323 into notch 317 and 360 of cross trunnion and wing bearing connecting flange assembly 331 to prevent collar 303 from unscrewing.

Driveshaft Coupling 300 can be partially assembled or disassembled by removing bolts 340-343 through access windows 332 and 333, removing bolts 336-339 through access window 334-335.

Novel Features May Include:

In Reference to the First Embodiment (#100).

U.S. Pat. No. 4,053,248 discloses a cross tooth flange design that is commercially available and even has an ISO standard. There are boltholes used to couple this flange to a mating flange with teeth.

What is novel about the present invention is that there is a rotatable collar, such as a threaded collar 103, in place of the four bolts to hold the flanges together. The present inventors have not seen a combination of a cross-tooth flange and a rotatable collar, such as a threaded collar. The cross-tooth flange 101 of the present invention has a novel threaded outside diameter and notches to prevent the locking ring 102 from rotating. The threaded collar 103 with external notches and internal retaining ring groove 110 is also believed to be novel. The method of using a locking ring 102 to prevent the threaded collar 103 from unscrewing is believed to be novel as well.

The following combination of the assembly which is believed to be novel includes: Cross-tooth flanges 101 and a threaded collar 103 with external notched and internal retaining ring grove 110, and a retaining ring 104, and a locking ring 102.

In Reference to the Second Embodiment (#200):

A standard off-the-shelf wing bearing kit employs four bolts to secure the wing bearing to the input and output yokes of the universal joint. In an embodiment of the present invention, the present inventions have replaced two of the four wing bearings with modified wing bearings that have a clamping shoulder to replace the bolts. What is believed to be novel is a universal joint comprising a wing bearing 203, 204, 206, 207 with a clamping shoulder 213. Using a threaded collar 202 to secure a wing bearing 203, 204, 206, 207 with a clamping shoulder 213 to a circular wing bearing flange 201 with a threaded outer diameter is believed to be novel. Employing a threaded collar 202 with a thin lip 226 as disclosed herein to be folded into a notch 225 on a wing bearing 203, 204 to prevent unscrewing is believed to be novel. The combination of the assembly which is believed to be novel includes: A universal joint employing a wing bearing 203, 204, 206, 207 with a clamping shoulder 213, a grooved flange face 201 with threaded outer diameter, and a threaded collar 202 with internal shoulder and external locking systems.

In Reference to the Third Embodiment (#300):

The present inventors are placing two joints/couplings similar to coupling 200 of the second embodiment back to back by bolting the two together with a wing bearing connecting flange 305.

PARTS LIST

The following is a list of exemplary parts and materials suitable for use in the present invention:

| Part | Description |
|---|---|
| 100 | Driveshaft Coupling |
| 101 | Crossed Toothed threaded flange, such as that described in International Standard ISO 12667 for commercial vehicles and buses - Cross tooth propeller shaft flanges, type T (Preferably made of alloy steel) |
| 102 | Retaining and locking ring (preferably made of a malleable material such as a soft alloy steel) |
| 103 | Collar (preferably made of alloy steel with a hardness of at least 48 HRC) |
| 104 | Retaining ring (such as Smalley, Spirolox ® internal retaining ring part number RR-612) |
| 105 | Cross tooth coupling flange (preferably attached to a Cornay ® CVX-30 constant velocity joint) |
| 106 | Threads of cross-toothed threaded flange |
| 107 | Threads of collar |
| 108 | Cross teeth of cross-toothed threaded flange |
| 109 | Cross teeth of cross-toothed coupling flange |
| 110 | Collar Groove |
| 111 | Grooves of cross-toothed threaded flange |

-continued

| Part | Description |
| --- | --- |
| 112 | Grooves of collar |
| 113 | Tabs of retaining and locking ring |
| 114 | Tabs of retaining and locking ring |
| 115 | Shoulder of cross-toothed threaded flange |
| 116 | Constant velocity joint or coupling |
| 200 | Driveshaft Coupling |
| 201 | Wing bearing threaded flange (preferably made of alloy steel) |
| 202 | Collar (preferably made of alloy steel with a hardness of at least 48 HRC) |
| 203 | Shouldered wing bearing (preferably made of alloy steel with an internal bearing surface having a hardness of at least 58-62 HRC, for example Spicer wing bearing series - 5C) |
| 204 | Shouldered wing bearing |
| 205 | Wing bearing yoke (for example Spicer wing bearing series - 5C) |
| 206 | Wing bearing (for example Spicer wing bearing series - 5C) |
| 207 | Shouldered wing bearing |
| 208 | Cross trunnion (for example Spicer wing bearing series - 5C) |
| 209 | Bolt (preferably of the Torx or socket head cap screw type - Grade 8) |
| 210 | Bolt |
| 211 | Bolt |
| 212 | Bolt |
| 213 | Shoulder of collar |
| 214 | Shoulder of wing bearings |
| 215 | Threads of collar |
| 216 | Threads of flange |
| 217 | Notch |
| 218 | Key |
| 219 | Key |
| 220 | Notch |
| 221 | Trunnion |
| 222 | Shoulder |
| 223 | Shoulder |
| 224 | Notch |
| 225 | Notches of shouldered wing bearings |
| 226 | Lips of collar |
| 227 | Notch |
| 228 | Trunnion |
| 229 | Trunnion |
| 230 | Trunnion |
| 231 | Key |
| 232 | Key |
| 233 | Shoulder |
| 234 | Shoulder of wing bearings |
| 235 | Hole |
| 236 | Hole |
| 237 | Hole |
| 238 | Hole |
| 239 | Window |
| 240 | Window |
| 241 | Notch |
| 300 | Driveshaft Coupling |
| 301 | Wing bearing threaded flange (preferably made of alloy steel) |
| 302 | Collar (preferably made of alloy steel with a hardness of at least 48 HRC) |
| 303 | Collar |
| 304 | Wing bearing threaded flange |
| 305 | Wing bearing connecting flange (preferably made of alloy steel) |
| 306 | Threads of wing bearing threaded flange |
| 307 | Notch |
| 308 | Notch |
| 309 | Threads of collar |
| 310 | Shoulder of collar |
| 311 | Lip |
| 312 | Notch of collar |
| 313 | Key |
| 314 | Shoulder |
| 315 | Key |
| 316 | Shoulder |
| 317 | Notch of cross trunnion and wing bearing connecting flange assembly |
| 318 | Shoulder |
| 319 | Shoulder |
| 320 | Cross trunnion and wing bearing assembly |
| 321 | Key |
| 322 | Shoulder of collar |
| 323 | Lip |
| 324 | Threads of collar |
| 325 | Notch of collar |
| 326 | Notch |
| 327 | Notch |
| 328 | Shoulder |
| 329 | Threads of wing bearing threaded flange |
| 330 | Cross trunnion and wing bearing assembly |
| 331 | Shoulder |
| 332 | Window |
| 333 | Window |
| 334 | Window |
| 335 | Window |
| 336 | Bolt |
| 337 | Bolt |
| 338 | Bolt |
| 339 | Bolt |
| 340 | Bolt (preferably of the Torx or socket head cap screw type - Grade 8) |
| 341 | Bolt |
| 342 | Bolt |
| 343 | Bolt |
| 344 | Hole of connecting flange |
| 345 | Hole of connecting flange |
| 346 | Hole of connecting flange |
| 347 | Hole of connecting flange |
| 348 | Notch |
| 349 | Notch |
| 350 | Key |
| 351 | Key |
| 352 | Key |
| 353 | Shoulder of wing bearing connecting flange |
| 354 | Shoulder |
| 355 | Shoulder |
| 356 | Notch |
| 357 | Shoulder of wing bearing and cross trunnion and wing bearing connecting flange assembly |
| 358 | Shoulder of wing bearing and cross trunnion and wing bearing connecting flange assembly |
| 359 | Notch |
| 360 | Notch of cross trunnion and wing bearing connecting flange assembly |
| 361 | Shoulder of wing bearing and cross trunnion and wing bearing connecting flange assembly |
| 362 | Shoulder of wing bearing and cross trunnion and wing bearing connecting flange assembly |
| 363 | Notch |
| 364 | Notch |
| 365 | Shoulder of wing bearing threaded flange |
| 366 | Shoulder |
| 367 | Shoulder of wing bearing connecting flange |
| 368 | Key |

All measurements disclosed herein are at standard temperature and pressure, at sea level on Earth, unless indicated otherwise.

The foregoing embodiments are presented by way of example only; the scope of the present invention is to be limited only by the following claims.

The invention claimed is:

1. A drive shaft apparatus, comprising:
   a) a first drive shaft section that includes a first flange having an annular externally threaded peripheral portion;
   b) a second drive shaft section that includes a second flange having an annular, externally threaded peripheral portion;
   c) a central annular connecting flange positioned in between said first and second flanges;

d) a pair of cross trunnion assemblies, the cross trunnion assemblies being next to and on opposing sides of the annular connecting flange;
e) a pair of threaded collars, each collar connecting a said cross trunnion assembly to a said flange to a flange;
f) a shoulder on each said collar to engage a mating shoulder on a said trunnion assembly;
g) one said collar having an internally threaded section that engages the externally threaded section of the first flange;
h) another said collar having an internally threaded section that engages the externally threaded section of the second flange;
i) a plurality of key and slot connections that interlock to provide an interlocking interface between each flange and each trunnion assembly; and
j) bolted connections the secure each trunnion assembly to the central annular connecting flange.

2. The apparatus of claim 1, wherein each trunnion assembly includes a universal joint.

3. The apparatus of claim 1 wherein one of said flanges is a driving flange.

4. The apparatus of claim 1, wherein at least one of the collars is of an alloy steel, plastic, aluminum, or composite material.

5. The apparatus of claim 1, further comprising a locking system for locking one or more of the threaded collars against rotating.

* * * * *